(12) United States Patent
Patariu et al.

(10) Patent No.: US 8,467,534 B2
(45) Date of Patent: Jun. 18, 2013

(54) METHOD AND SYSTEM FOR SECURE ACCESS AND PROCESSING OF AN ENCRYPTION/DECRYPTION KEY

(75) Inventors: Kevin Patariu, San Diego, CA (US); Iue-Shuenn Chen, San Diego, CA (US); Jay Kwok Wa Li, Milpitas, CA (US); Cynthia Dang, Cerritos, CA (US); Mark Taylor Core, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 2381 days.

(21) Appl. No.: 10/417,051

(22) Filed: Apr. 16, 2003

(65) Prior Publication Data

US 2004/0247129 A1    Dec. 9, 2004

(51) Int. Cl.
*H04L 29/06* (2006.01)
(52) U.S. Cl.
USPC ........................................................ 380/277
(58) Field of Classification Search
USPC ........................................................ 380/277
See application file for complete search history.

(56) References Cited

U.S. PATENT DOCUMENTS

| | | | | |
|---|---|---|---|---|
| 4,206,315 A * | 6/1980 | Matyas et al. | ................ | 713/180 |
| 4,465,901 A | 8/1984 | Best | | |
| 4,688,250 A * | 8/1987 | Corrington et al. | ........... | 713/170 |
| 4,881,263 A * | 11/1989 | Herbison et al. | ............. | 713/162 |
| 5,016,277 A * | 5/1991 | Hamilton | ...................... | 713/150 |
| 6,317,829 B1 | 11/2001 | Van Oorschot | | |
| 7,089,426 B1 * | 8/2006 | Bagshaw | ...................... | 713/193 |
| 7,110,542 B1 * | 9/2006 | Tripathy | ........................ | 713/193 |
| 7,200,235 B1 * | 4/2007 | Trimberger | ................... | 380/277 |
| 2001/0044897 A1 * | 11/2001 | Ishiguro et al. | ............... | 713/171 |
| 2001/0052070 A1 * | 12/2001 | Oishi et al. | .................... | 713/151 |
| 2002/0059623 A1 * | 5/2002 | Rodriguez et al. | ............. | 725/91 |

FOREIGN PATENT DOCUMENTS

EP    1282261 A    2/2003

OTHER PUBLICATIONS

Menezes et al, "Handbook of Applied Cryptology", CRC Press LLC, 1997, USA, XP002306245, p. 652.
Communication pursuant to Article 94(3) EPC for European Patent Application No. 04 001 860.Aug. 1525, dated Mar. 22, 2010.

* cited by examiner

*Primary Examiner* — Jason Gee
(74) *Attorney, Agent, or Firm* — Sterne, Kessler, Goldstein & Fox PLLC

(57) ABSTRACT

Secure access and processing of an encryption/decryption key may include generating one or more keys within a key controller block of a chip. The generated keys may be transferred from the key controller block of the chip to an on-chip bus interface block via a secure serial link. The transferred keys may be stored in registers which may be accessible by only the key controller block of the chip. In this regard, the generated keys may be written to one or more of the key registers only by the key controller block. Furthermore, a written key may be read from a key register only by the key controller block. During the transfer of a generated key, a data valid signal may be used to indicate valid keys in a data signal used to transfer the keys via the secure serial link.

25 Claims, 4 Drawing Sheets

METHOD AND SYSTEM FOR SECURE ACCESS AND PROCESSING OF AN ENCRYPTION/DECRYPTION KEY

CROSS-REFERENCE TO RELATED APPLICATIONS/INCORPORATION BY REFERENCE

This application makes reference to, claims priority to and claims the benefit of U.S. Provisional Patent Application Ser. No. 60/455,463 entitled "System and Method for Secure Access and Processing of an Encryption/Decryption Key" filed on Mar. 18, 2003.

This application also makes reference to:

U.S. patent application Ser. No. 10/414,844 entitled "Method And System For Data Encryption And Decryption" filed on Apr. 15, 2003;

U.S. patent application Ser. No. 10/414,724 entitled "Method And System For Controlling An Encryption/Decryption Engine Using Descriptors" filed on Apr. 15, 2003;

U.S. patent application Ser. No. 10/414,577 entitled "Method And System For Data Encryption/Decryption Key Generation And Distribution" filed on Apr. 15, 2003; and U.S. patent application Ser. No. 10/414,575 entitled "Method And System For Data Encryption And Decryption" filed on Apr. 15, 2003.

The above stated applications are incorporated herein by reference in their entirety.

FIELD OF THE INVENTION

Certain embodiments of the invention relate to data security. More specifically, certain embodiments of the invention relate to a method and system for secure access and processing of an encryption/decryption key.

BACKGROUND OF THE INVENTION

In some conventional encryption applications, it is necessary to send data to a hard disk to be encrypted and retrieve data from the hard disk for decryption. One such application is personal video recording (PVR). In such systems, the encryption/decryption functions are implemented by separate devices between the ATA host adapter and the ATA bus connector. ATA stands for AT Attachment, a standardized interface used by storage devices such as hard disk drives, CD drives and DVD drives. ATA compatible drives may also be referred to as integrated drive electronics (IDE) drives. One drawback with conventional separate device implementations is that unencrypted or "clear" data is available at the interface between the ATA host adapter and the external encryption/decryption chip, and can be intercepted and stored in unencrypted form.

The encryption used in conventional systems is not particularly "strong" and could be broken relatively easily. Furthermore, in certain instances where data may be made available to various system components, data integrity may be compromised by other components that may gain access to the encryption/decryption keys. This may be particularly true, for example, in systems that utilize a shared bus having a common bus interface.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

Certain embodiments of the invention provide a method and system for secure access and processing of an encryption/decryption key. A method for secure access and processing of an encryption/decryption key may include generating one or more keys within a key controller block of a chip. One or more of the generated keys may be transferred from the key controller block of the chip to an on-chip bus interface block via a secure serial link. One or more of the transferred keys may be stored in registers which are accessible by only the key controller block of the chip. In this regard, the generated keys may be written to one or more of the key registers only by the key controller block. Furthermore, a written key may be read from the key register only by the key controller block. Additionally, during the transfer of a generated key, a data valid signal may be used to indicate valid keys in a data signal used to transfer the keys via the secure serial link. Prior to transferring the keys via the secure serial link, the keys may be serialized. The on-chip bus interface block may be an IDE, PCI, SCSI, or USB bus interface.

Another embodiment of the invention provides, a machine-readable storage, having stored thereon a computer program having at least one code section for providing secure access and processing of encryption/decryption keys, the at least one code section executable by a machine for causing the machine to perform the steps as described above.

A system for secure encryption and decryption key processing may include a key generator adapted to generate at least one key within a key controller block of a chip. A key transmitter may be adapted to transfer the generated key from the key controller block of the chip to an on-chip bus interface block via a secure serial link. A key register may be adapted to store the transferred key and the key register may be accessible by only the key controller block. The key controller block may be adapted to write the key in the key register. Furthermore, only the key controller block may be adapted to read a written key from a key register. The key transmitter may be adapted to validate periods of a valid data signal used to transfer a key via the secure serial link. The key generator may be further adapted to serialize a key prior to transferring the key via the secure serial link. The on-chip bus interface block may be an IDE, PCI, SCSI, or USB bus interface. In one aspect of the invention, the key generator and the key transmitter may be integrated into a single on-chip key module.

These and other advantages, aspects and novel features of the present invention, as well as details of a illustrated embodiment thereof, will be more fully understood from the following description and drawings.

DETAILED DESCRIPTION OF THE INVENTION

Figure 1:
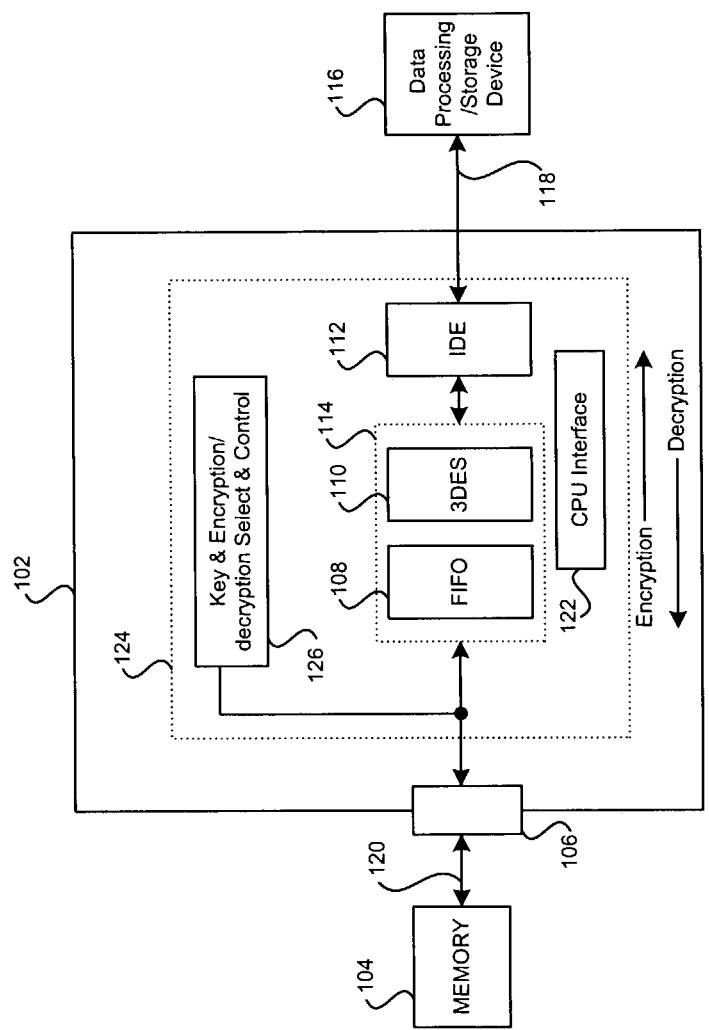
FIG. 1 is a block diagram of an exemplary system for memory to IDE encryption/decryption in accordance with an embodiment of the invention.

Certain embodiments of the invention provide a method and system for secure access and processing of an encryption/ decryption key. Secure access and processing of encryption/decryption keys may include generating one or more keys within a key controller block of a chip. One or more of the generated keys may be transferred from the key controller block of the chip to an on-chip bus interface block via a secure serial link. One or more of the transferred keys may be stored in registers which may be accessible by only the key controller block of the chip. In this regard, the generated keys may be written to one or more of the key registers only by the key controller block. Furthermore, a written key may be read from the key register only by the key controller block. During the transfer of a generated key, a data valid signal may be used to indicate valid keys in a data signal used to transfer the keys via the secure serial link. Prior to transferring the keys via the secure serial link, the keys may be serialized. The on-chip bus interface block may be an IDE, PCI, SCSI, or USB bus interface.

A memory to bus interface data encryption and decryption may include encrypting data by a encryption/decryption engine or processor and transferring the encrypted data across a first bus interface to a data processing and/or storage device coupled to the first bus interface. The encryption engine may receive encrypted data from a device coupled to the first bus interface and decrypt the received encrypted data. In this regard, unencrypted data never traverses across the first bus interface, and is thereby not accessible to devices coupled to the first bus interface. An encryption function and a decryption function associated with the encryption/decryption engine may be integrated within a bus adapter, for example, an IDE bus adapter.

In one embodiment of the invention, the IDE host interface may be a two channel ATA host adapter that conforms to the AT Attachment with Packet Interface (ATA/ATAPI-5) specification. In this regard, the two channel host adapter may include a primary and a secondary channel. The IDE host interface may be adapted to function as a bus bridge between an internal local bus and an external ATA bus to support programmed I/O (PIO) data transfer. The IDE host interface may also include a memory bus interface and DMA controllers to support legacy multiword DMA as well as ultra-DMA data transfer protocols. Cyclic redundancy check (CRC) generation for ultra-DMA transfers may also be performed in compliance with the ATA/ATAPI-5 specification.

In accordance with an aspect of the invention, pin count may be reduced by utilizing a design that shares a single ATA address, data, and chip select busses between the primary and secondary channels. In this arrangement, each channel may be adapted to support a master and a slave device for a maximum of four IDE devices. The design may include two 64-bit 3DES/DES encryption/decryption cores that can optionally be used to encrypt or decrypt DMA transfers to or from IDE devices. Configuration and control of the encryption/decryption operation may be accomplished using a DES control register. Two or more 128-bit key registers, for example, may be also provided and these registers may be programmed using a two-wire serial key bus from a transport block.

By integrating the encryption/decryption function into the IDE host interface, cost may be significantly reduced relative to an external encryption/decryption solution. Moreover, the presence of unencrypted data on the external ATA bus is also eliminated, thereby eliminating data intrusion. The 3DES/DES encryption may be more robust and accordingly, more difficult to decipher than conventional methods.

FIG. 1 is a block diagram of an exemplary system for memory to IDE encryption/decryption in accordance with an embodiment of the invention. Referring to FIG. 1, there is shown a chip 102 having integrated therein, an IDE controller block 124. IDE controller block 124 may include a FIFO block 108, 3DES block 110, IDE interface block 112, CPU interface 122 and key and encryption/decryption select and control block 126. The 3DES block 110 and the FIFO block 108 may form an encryption/decryption processor block 114. Chip 102 may include a memory and/or bus interface block 106.

The IDE interface block 112 may be coupled to an external data processing/storage device 116 via a first bus and/or bus interface 118. The first bus 118 may be an ATA bus, although the invention is not limited in this regard. Alternatively, the first bus 118 may be, for example, a SCSI bus, a PCI bus, USB or other suitable bus. The external data processing/storage device 116 may be, for example, a hard disk, memory or data processing or storage device.

Chip 102 may also include a bus interface block 106. The FIFO block 108 may be coupled to the bus interface block 106. A memory 104 may be coupled to the bus interface block 106 via a second bus 120. The memory 104 may be a random access memory (RAM) such as a dynamic RAM (DRAM). In this regard, the memory and/or bus interface block 106 may be a DRAM controller, for example. The exemplary system of FIG. 1 could be part of a personal video recording (PVR) system.

Although chip 102 may include IDE controller block 124, the invention is not limited in this regard. In general, chip 102 may alternatively include any suitable bus controller block such as a PCI controller block or SCSI controller block, instead of IDE controller block 124. In this regard, the IDE controller block 124 may be replaced by a PCI controller block or a SCSI controller block respectively. For example, in a case where IDE controller block 124 is replaced by a PCI controller block, then IDE interface block 112 may be replaced by a PCI interface block. In a case where IDE controller block 124 is a SCSI controller block, then IDE interface block 112 may be replaced by a SCSI interface block. Accordingly, the PCI interface block or the SCSI interface block may be coupled to the external data processing/storage device 116 via the first bus 118.

The key and encryption/decryption select and control block 126 may include suitable control logic and/or circuitry that may be adapted to select a function to be performed by the encryption/decryption processor block 114. In this regard, the encryption/decryption processor block 114 may be adapted to select or deselect one of an encryption operation, a decryption operation and a bypass function. The control logic and/or circuitry in the key and encryption/decryption select and control block 126 may be further adapted to facilitate selection and control of encryption and decryption keys to be utilized by the 3DES block 110. In this regard, the key and encryption/decryption select and control block 126 may control which of a plurality of keys may be utilized by the 3DES block 110. The key and encryption/decryption select and control block 126 may further include suitable control logic and/or circuitry that may be adapted to provide various select signals that may be used to route data throughout chip 102 when any of the encryption, decryption, or bypass functions or operations may be required.

The CPU interface block 122 may include suitable logic and/or circuitry that may be adapted to provide control of the operation of chip 102 by an external processor. The external processor may be a host processor.

In operation, data to be encrypted by the encryption/decryption processor block 114 and transferred to the external data processing/storage device 116, may be received from the memory 104 via the second bus 120. The data to be encrypted may be transferred to the encryption/decryption processor block 114 where it may be buffered in FIFO buffer 108. The memory or bus interface block 106 may be adapted to control the transfer of the data to be encrypted from the memory 104 to the FIFO buffer 108. The received data in the FIFO buffer 108 may be encrypted by the 3DES block 110 and communicated to the IDE interface block 112. The IDE interface block 112 may be adapted to transfer the encrypted data to the external data processing/storage device 116 via the first bus 118. In this regard, the unencrypted data may never be placed on the first bus 118 where it may be accessible by other devices coupled to the first bus.

In operation, encrypted data stored in the external data processing/storage device 116 may be transferred from the external data processing/storage device 116 for decryption by the encryption/decryption processor block 114. The IDE interface block 112 may be adapted to control the transfer of the encrypted data from the external data processing/storage device 116 via the first bus 118. To facilitate decryption, the transferred encrypted data may first be buffered in the FIFO block 108 and then decrypted by the 3DES block 110. Subsequent to decryption, the decrypted data may be transferred to the memory 104. The memory and/or bus interface block 106 may be adapted to facilitate the transfer of the decrypted data to the memory 104 via bus 120. In this regard, unencrypted data may never be placed on the first bus 118 where it might be accessible by other devices coupled to the first bus 118.

Figure 2:
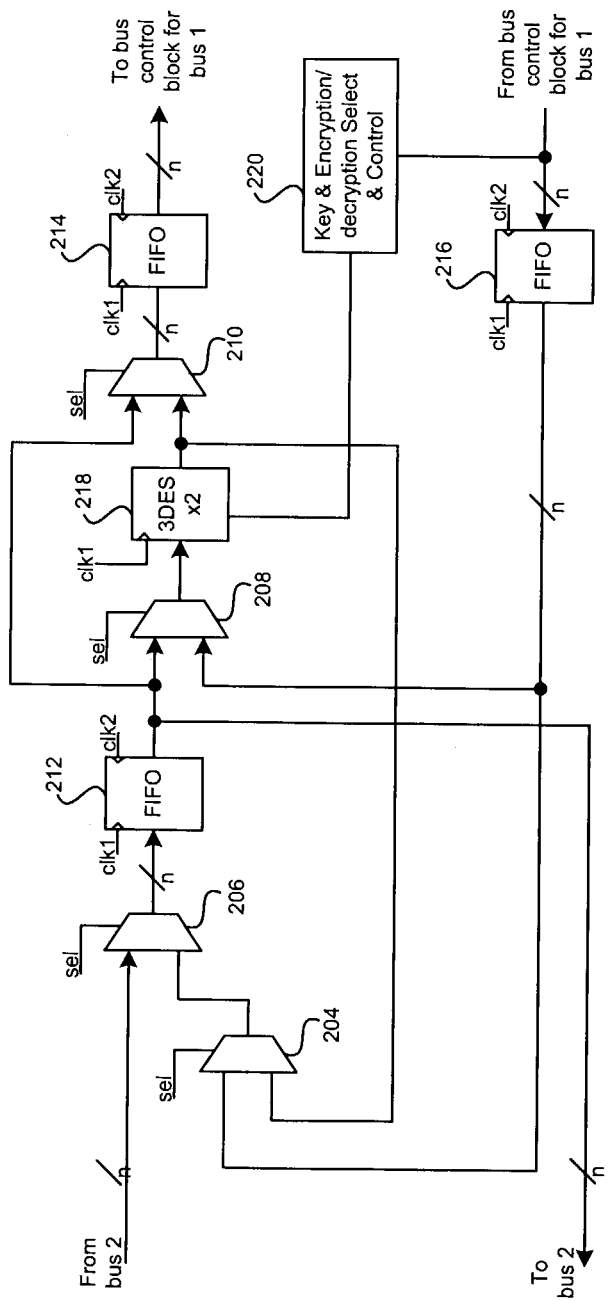
FIG. 2 is a block diagram illustrating the encryption/decryption of data using exemplary memory to IDE system of FIG. 1 in accordance with an embodiment of the invention.

FIG. 2 is a block diagram illustrating the encryption/decryption of data using exemplary memory to IDE system of FIG. 1 in accordance with an embodiment of the invention. Referring to FIG. 2, there are shown selectors 204, 206 208, 210, FIFO buffers 212, 214, 216, 3DES block 218 and key and encryption/decryption select and control block 220. The selectors 204, 206, 208, 210 may be multiplexers. FIFO 212 may be a bus buffer, FIFO 214 may be a read buffer and FIFO 216 may be a write buffer. The selectors 204, 206 208, 210, FIFO buffers 212, 214, 216 and 3DES block 218 may be adapted to handle n-bit wide data. In one aspect of the invention, n may be, for example, 128 or other suitable value. Each of the FIFOs 212, 214, 216 may be adapted to handle a first clock domain clk1 associated with a first bus and a second clock domain clk2 associated with a second bus. The first clock domain may be an 81 MHz clock and the second clock domain may be a 33 MHz clock, although the invention may not be limited in this regard. In one aspect of the invention, a plurality of 3DES block 218 may be provided for encrypting and decrypting data.

The key and encryption/decryption select and control block 220 may include suitable logic that may be used to select or deselect a first and/or a second input of each of the selectors 204, 206, 208, 210. The key and encryption/decryption select and control block 220 may use the select pins of selectors 204, 206, 208, 210 to select or deselect a particular selector. In this regard, the key and encryption/decryption select and control block 220 may be used to route data through chip 102 during an encryption or decryption operation, or a bypass function.

During encryption, unencrypted data may be received from a device connected to a second bus. The device may be a memory device such as memory 104 (FIG. 1). Selector 206 may be enabled via a select pin, which may be adapted to permit the unencrypted data to be loaded into FIFO buffer 212 via a first input of selector 206. The buffered unencrypted data may be encrypted by the 3DES block 218. In this regard, the selector 208 may be enabled by its select pin. While selector 210 is disabled or deselected via its select pin, the unencrypted data may then be communicated from the FIFO 212 through a first input of selector 208 to the 3DES block 218. The 3DES block may encrypt the unencrypted data. Selector 210 may be enabled by its select pin and a second input of selector 210 may communicate any resulting encrypted data to the FIFO 214. The encrypted data may then be communicated via a first bus, to for example, a memory or other processing device connected to the first bus. In this regard, the data being transferred over the first bus may be encrypted.

In accordance with another aspect of the invention, a bypass function may also be provided. In a case where encrypted data may be transferred from the memory connected to the first bus to a memory or processing device connected to the second bus, the 3DES block 218 may be bypassed. In this case, the selector 208 may be deselected or disabled by its select pin. However, selector 210 may be selected and a first input of selector 210 may be used to facilitate transfer of the encrypted data from the FIFO 212 to FIFO 214.

During decryption, encrypted data may be received from a device connected to the first bus. The device may be an external data processing/storage device 116 of FIG. 1. The encrypted data may be buffered in FIFO 216. Selector 208 may be enabled by its select pin and the encrypted data may be communicated to 3DES block 218 via a second input of selector 208. After the encrypted data is decrypted by 3DES block 218, while selector 110 may be deselected or disabled by its select pin, selector 204 and selector 206 may be enabled by their respective select pins. The decrypted data may be transferred to the buffer 212 via a second input of selector 204 and a second input of selector 206 respectively. While selector 208 may be deselected or disabled by its select pin, the decrypted data may be transferred from the FIFO buffer 212 to the memory coupled to the second bus.

Figure 3:
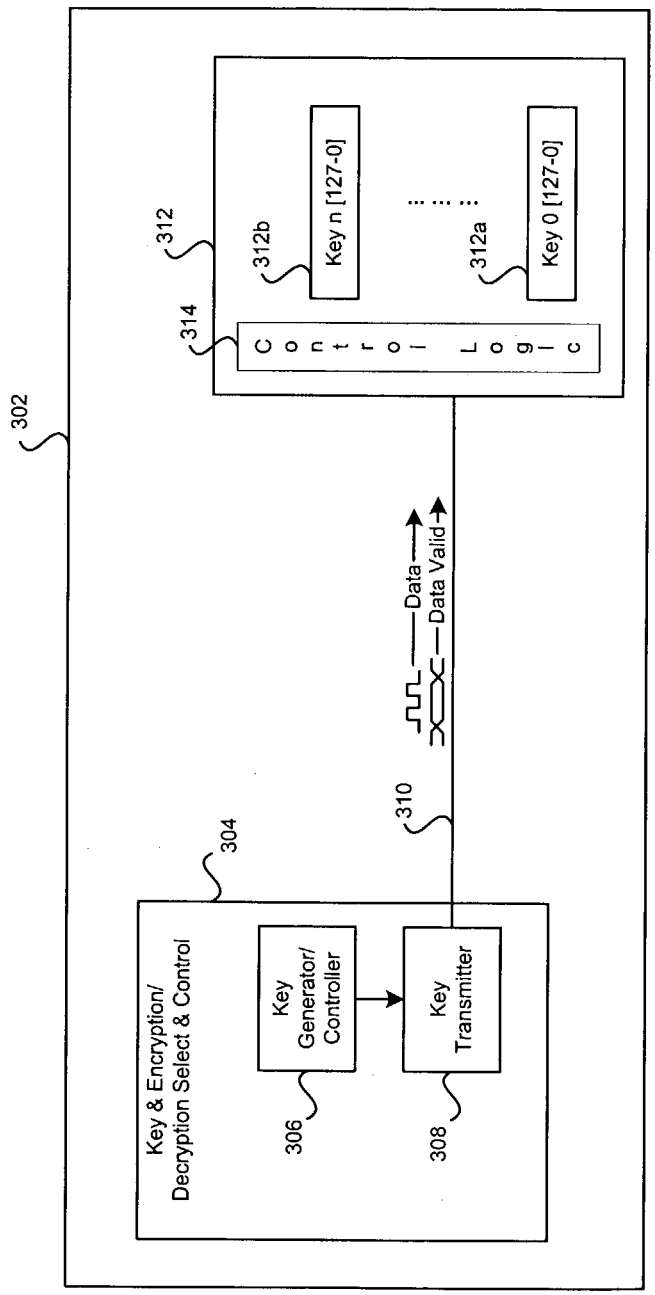
FIG. 3 is a block diagram of an exemplary system for accessing and processing an encryption/decryption key in accordance with an embodiment of the invention.

FIG. 3 is a block diagram of an exemplary system for secure access and processing of an encryption/decryption key in accordance with an embodiment of the invention. Referring to FIG. 3, there is shown a block diagram of a chip 302 which may include a key and encryption/decryption select and control block 304, a serial bus or link 310 and IDE block 312. IDE block 312 may include at least one key register of memory 312a, 312b and a control logic block 314. For example, there may be n key registers. As illustrated, n is equivalent to one (1) and thus, there are 2 key registers in the on-chip IDE block 312. Notwithstanding, the invention is not limited in this regard. Furthermore, although an on-chip IDE bus block 312 is illustrated, other on-chip bus interfaces such as PCI, USB, SCSI, may be utilized.

The key and encryption/decryption select and control block 304 may include at least one key generator/controller 306, key transmitter 308 and other suitable select and/or control logic and/or circuitry not shown. Although the key generator/controller 306 is illustrated as part of the key encryption/decryption select and control block 304, the invention is not limited in this regard. Accordingly, the key generator/controller 306 may be associated with a core transport and control function of chip 302. In any case, the encryption/decryption select and control block 304 may be adapted to partition encryption/decryption keys which may be utilized by the on-chip IDE block 312. In one aspect of the invention, the key generator/controller 306 and the key transmitter 308 may be integrated into a single on-chip key processor module.

The serial link 310 may be any suitable high speed bus capable of transferring data between the key and encryption/decryption select and control block 304 and the on-chip IDE block 312. Exemplary signals communicated over the serial link may include serial data and a serial data valid signal. The serial data valid signal may serve to signify the time periods or intervals when the serial data communicated via serial link 310 is valid. Although not shown, the on-chip IDE block 312 may include one or more encryption/decryption processors that may be adapted to utilize the encryption and decryption keys for respective encryption and decryption operations. Notwithstanding, FIG. 1 and FIG. 2 illustrate various exemplary encryption/decryption processors.

Figure 4:
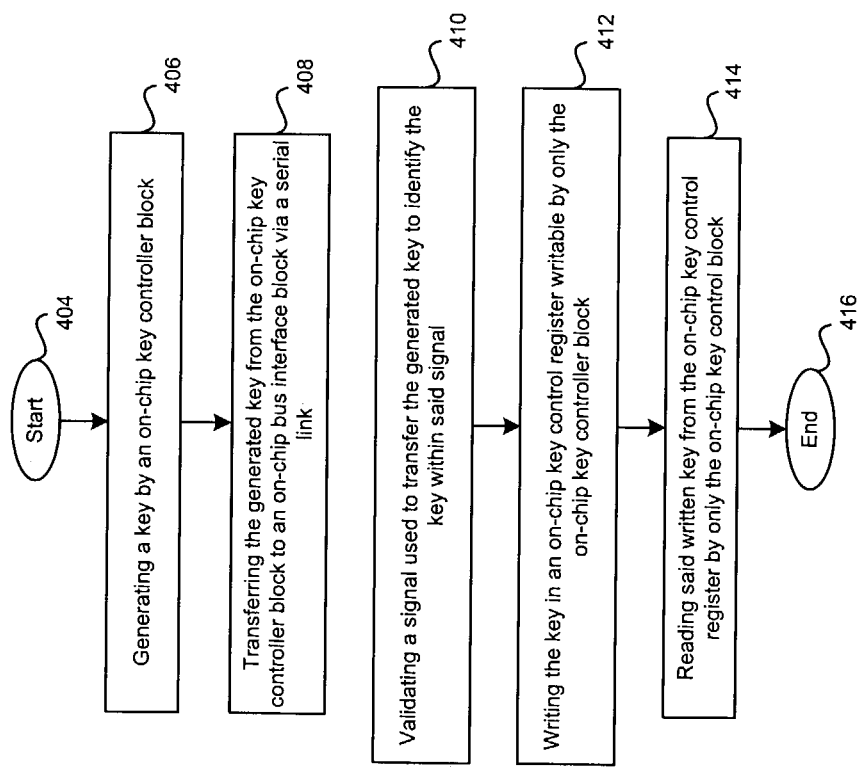
FIG. 4 is an flow chart illustrating exemplary steps for secure access and processing of an encryption/decryption key in accordance with an embodiment of the invention.

FIG. 4 is an flow chart illustrating exemplary steps for secure access and processing of an encryption/decryption key in accordance with an embodiment of the invention. Referring to FIG. 4, the exemplary steps may start with step 404. Subsequently, in step 406, a key may be generated by an on-chip key controller block. In step 408, the generated key may be transferred from the on-chip key controller block to an on-chip bus interface block via a serial link. The serial link may be a high speed serial link. In step 410, a signal used to transfer the generated key via the serial link may be validated to identify the key within the transmitted signal. In step 412, the key may be written to an on-chip key control register writable by only the on-chip key controller block. In step 414, the key may be read from the on-chip key control register by only the on-chip key controller block. In this regard, other devices that may be coupled to the on-chip bus interface block may not be able to read and/or modify the key. The exemplary steps may end with step 416.

In operation, under control of suitable hardware and/or software, the key generator/controller block 306 may be adapted to generate one or more key values. The generated key values may be processed by the key transmitter 308, which may be adapted to serialize key data. Subsequent to serialization, key transmitter 308 may be adapted to transmit the serial key data over the serial link 310. In addition to the serial key data, at least one control signal may also be transmitted via the serial bus. In this regard, a serial data valid signal may be transferred via serial link 310, to the IDE block 312. The control logic block 314 may be adapted to associate and/or control the transfer of the serially transmitted keys to their appropriate key registers in the IDE block 312. The association and transfer of the serially transmitted keys via the serial bus may include writing and storing the serially transmitted keys to one or more key registers. Additionally, the control logic block 314 may also be adapted to control access to the key registers 312a, 312b.

In accordance with an embodiment of the invention, the key registers 312a, 312b in the IDE control block 312 may only be accessed by the key and encryption/decryption select and control block 304. Accordingly, the key registers 312a, 312b in the IDE control block 312 may only be written by the key and encryption/decryption select and control block 304. Consequently, other devices that may be connected to the IDE control block 312 may not be able to write to the key registers 312a, 312b in the IDE block 312. In another aspect of the invention, the key registers in the IDE control block 312 may only be read by the key and encryption/decryption select and control block 304. In this regard, other devices that may be connected to the IDE control block 312 may not be able to read the key registers 312a, 312b in the IDE block 312. Consequently, integrity of the key data transferred to the IDE block and stored in the key registers 312a, 312b may be securely maintained.

In another aspect of the invention, a 3DES encryption/decryption simulation may be provided to illustrate exemplary encryption and decryption processes. During the simulation, an input data may acquired from an input file. For example, an input file, namely test1.encrypt.dat, may contain the following information:

0 0 01234567 89abcdef fedcba98 76543210
23456789 abcdef01
456789ab cdef0123

In this regard, the input file may specify a 3DES encryption using a key of, for example, 01234567 89abcdef fedcba98 76543210, on two 64-bit words of data. The two 64-bit words of data may be 23456789abcdef01 and fedcba9876543210.

Upon executing the 3DES operation using, for example, 3DES block 208 of FIG. 2, with the test1.encrypt.dat input file, an output file may be generated. In this regard, an output file, namely test1.encrypt.dat.out, may be generated. The contents of the generated test1.encrypt.dat.out file may be as follows:

a47606af 132eeff7
792e2b91 7c75dce4

The encrypted data in the test1.encrypt.dat.out file may be decrypted using the following test1.decrypt.dat.in file. The contents of the test1.decrypt.dat.in file may be as follows.

1 0 01234567 89abcdef fedcba98 76543210
a47606af 132eeff7
792e2b91 7c75dce4

Upon decryption of the test1.decrypt.dat.in file, an output file, namely test1.decrypt.dat may be generated. The contents of test1.decrypt.dat file may be as follows.

23456789 abcdef01
456789ab cdef0123

In this case, the decryption returns the original data.

Accordingly, the present invention may be realized in hardware, software, or a combination of hardware and software. The present invention may be realized in a centralized fashion in one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for secure encryption and decryption key processing, the method comprising:

generating at least one key within a key controller block of a chip;

transferring said generated at least one key from said key controller block of said chip to an on-chip bus interface block via a secure serial link, wherein said generated at least one key is transferred utilizing a serial data signal;

validating said transferred at least one key using a serial data validation signal, wherein said serial data validation signal is generated within said chip; and storing said validated at least one key in at least one key register which is accessible by only said key controller block;

wherein said validating comprises validating a plurality of periods of said serial data signal used to transfer said at least one key via said secure serial link, wherein said plurality of periods is designated by said serial data validation signal.

2. The method according to claim 1, wherein said storing comprises writing at least one key in said at least one key register by only said key controller block.

3. The method according to claim 2, comprising reading said at least one written key from said at least one key register by only said key controller block.

4. The method according to claim 1, comprising serializing said at least one key for transfer via said secure serial link.

5. The method according to claim 1, wherein said on-chip bus interface block is an IDE bus interface.

6. The method according to claim 1, wherein said on-chip bus interface block is a PCI bus interface.

7. The method according to claim 1, wherein said on-chip bus interface block is a SCSI bus interface.

8. The method according to claim 1, wherein said on-chip bus interface block is a USB bus interface.

9. A non-transitory machine-readable storage having stored thereon, a computer program having at least one code section for secure access and processing of an encryption key and decryption key, the at least one code section executable by a machine for causing the machine to perform steps comprising:

generating at least one key within a key controller block of a chip;

transferring said generated at least one key from said key controller block of said chip to an on-chip bus interface block via a secure serial link, wherein said generated at least one key is transferred utilizing a serial data signal;

validating said transferred at least one key using a serial data validation signal; and storing said validated at least one key in at least one key register which is accessible by only said key controller block;

wherein the code validates a plurality of periods of said serial data signal used to transfer said at least one key via said secure serial link, wherein said plurality of periods is designated by said serial data validation signal.

10. The non-transitory machine-readable storage according to claim 9, comprising code for controlling the writing of said at least one key in said at least one key register by only said key controller block.

11. The non-transitory machine-readable storage according to claim 10, comprising code for reading said at least one written key from said at least one key register by only said key controller block.

12. The non-transitory machine-readable storage according to claim 9, comprising code for serializing said at least one key for transfer via said secure serial link.

13. The non-transitory machine-readable storage according to claim 9, wherein said on-chip bus interface block is an IDE bus interface.

14. The non-transitory machine-readable storage according to claim 9, wherein said on-chip bus interface block is a PCI bus interface.

15. The machine-readable storage according to claim 9, wherein said on-chip bus interface block is a SCSI bus interface.

16. The non-transitory machine-readable storage according to claim 9, wherein said on-chip bus interface block is a USB bus interface.

17. A system for secure encryption and decryption key processing, the system comprising:

at least one key generator adapted to generate at least one key within a key controller block of a chip;

at least one key transmitter adapted to transfer said generated at least one key from said key controller block of said chip to an on-chip bus interface block via a secure serial link, wherein said generated at least one key is transferred utilizing a serial data signal; wherein:

said at least one key transmitter validates said transferred at least one key using a serial data validation signal, wherein said serial data validation signal is generated within said chip; and at least one key register adapted to store said validated at least one key, wherein said at least one key register is accessible by only said key controller block;

wherein said at least one key transmitter is adapted to validate a plurality of periods of said serial data signal used to transfer said at least one key via said secure serial link, wherein said plurality of periods is designated by said serial data validation signal.

18. The system according to claim 17, wherein only said key controller block is adapted to write said at least one key in said at least one key register.

19. The system according to claim 18, wherein only said key controller block is further adapted to read said at least one written key from said at least one key register.

20. The system according to claim 17, wherein said at least one key generator is adapted to serialize said at least one key for transfer via said secure serial link.

21. The system according to claim 17, wherein said on-chip bus interface block is an IDE bus interface.

22. The system according to claim 17, wherein said at least one key generator and said at least one key transmitter are integrated into a single on-chip key module.

23. The system according to claim 17, wherein said on-chip bus interface block is a PCI bus interface.

24. The system according to claim 17, wherein said on-chip bus interface block is a SCSI bus interface.

25. The system according to claim 17, wherein said on-chip bus interface block is a USB bus interface.

* * * * *

UNITED STATES PATENT AND TRADEMARK OFFICE
CERTIFICATE OF CORRECTION

| | |
|---|---|
| PATENT NO. | : 8,467,534 B2 |
| APPLICATION NO. | : 10/417051 |
| DATED | : June 18, 2013 |
| INVENTOR(S) | : Patariu et al. |

It is certified that error appears in the above-identified patent and that said Letters Patent is hereby corrected as shown below:

In the Claims:

Column 10
Line 10, please replace "The machine-readable" with --The non-transitory machine-readable--.

Signed and Sealed this
Thirteenth Day of August, 2013

Teresa Stanek Rea
*Acting Director of the United States Patent and Trademark Office*